(12) United States Patent
Longhurst et al.

(10) Patent No.: US 9,236,647 B2
(45) Date of Patent: Jan. 12, 2016

(54) TAGGED CABLE

(75) Inventors: Philip James Longhurst, Chelmondiston (GB); Philip Alfred Barker, Ipswich (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 897 days.

(21) Appl. No.: 12/934,888

(22) PCT Filed: Feb. 27, 2009

(86) PCT No.: PCT/GB2009/000546
§ 371 (c)(1),
(2), (4) Date: Sep. 27, 2010

(87) PCT Pub. No.: WO2009/118505
PCT Pub. Date: Oct. 1, 2009

(65) Prior Publication Data
US 2011/0025468 A1    Feb. 3, 2011

(30) Foreign Application Priority Data
Mar. 27, 2008  (GB) .................... 0805596.4

(51) Int. Cl.
| B65H 81/00 | (2006.01) |
| H01Q 1/22 | (2006.01) |
| G01V 15/00 | (2006.01) |
| G02B 6/44 | (2006.01) |
| H01B 7/288 | (2006.01) |
| H01Q 1/04 | (2006.01) |

(52) U.S. Cl.
CPC ............ *H01Q 1/2208* (2013.01); *G01V 15/00* (2013.01); *G02B 6/447* (2013.01); *H01B 7/288* (2013.01); *H01Q 1/04* (2013.01)

(58) Field of Classification Search
CPC   B32B 1/08; B32B 2250/02; B32B 2307/554; B32B 37/00; H01B 9/0611; H02G 15/003; H02G 15/18
USPC ......... 156/196, 187, 184, 188, 213, 500, 459, 156/53; 340/10.1, 10.51, 10.4; 174/70 R, 174/72 C; 385/101
See application file for complete search history.

(56) References Cited

U.S. PATENT DOCUMENTS

| 4,971,638 A * | 11/1990 | Bickley et al. .................. 156/48 |
| 2002/0158120 A1 | 10/2002 | Zierolf |
| 2004/0156601 A1 * | 8/2004 | Koyasu et al. ................ 385/100 |

(Continued)

FOREIGN PATENT DOCUMENTS

| CN | 1118910 A | 3/1996 |
| EP | 0108590 A1 | 5/1984 |

(Continued)

OTHER PUBLICATIONS

Chinese Application No. 200980114882.1, Chinese Office Action, issued Jun. 6, 2014, 10 pages.

*Primary Examiner* — Jacob T Minskey
*Assistant Examiner* — Vishal I Patel
(74) *Attorney, Agent, or Firm* — Patterson Thuente Pedersen, P.A.

(57) ABSTRACT

A method of forming a cable having an elongate core, including positioning a records component proximate to the elongate core, and covering the records component with a cable covering which directly or indirectly urges the records component against the elongate core.

9 Claims, 6 Drawing Sheets

(56) References Cited

U.S. PATENT DOCUMENTS

| | | | |
|---|---|---|---|
| 2004/0184747 A1* | 9/2004 | Koyasu et al. | ................ 385/101 |
| 2005/0259930 A1 | 11/2005 | Elkins, II et al. | |
| 2007/0159337 A1* | 7/2007 | Tethrake et al. | ........... 340/572.8 |
| 2008/0204235 A1 | 8/2008 | Cook | |

FOREIGN PATENT DOCUMENTS

| | | | |
|---|---|---|---|
| EP | 0 435 585 A2 * | 7/1991 | ............... G01V 3/12 |
| JP | 2003-203527 A | 7/2003 | |
| WO | WO 2007/114446 A1 | 10/2007 | |

* cited by examiner

TAGGED CABLE

PRIORITY CLAIM

The present application is a National Phase entry of PCT Application No. PCT/GB2009/000546, filed Feb. 27, 2009, which claims priority from Great Britain Application Number 0805596.4, filed Mar. 27, 2008, the disclosures of which are hereby incorporated by reference herein in their entirety.

TECHNICAL FIELD

This invention relates to apparatus, systems and methods for managing, identifying and tracking physical assets such as equipment and plant. The invention is particularly but not exclusively directed to the management of assets like tubes or cables using tagging techniques particularly by radio-frequency identification.

BACKGROUND

As may be expected, a telecommunications network of any geographical extent would include a quantity and variety of physical assets. A national network such as that managed and operated by the applicants in the UK includes an enormous variety and amount of plant and equipment deployed in locations which span the nation's length and breadth in underground, overhead, submarine and in-building implementations. For example, tens of millions of kilometers of transmission line cables of various types are installed annually in the field through routes which range from protected exchanges, to long stretches in hostile outdoors environments.

Currently, keeping tabs on the location of plant and equipment of such a network typically involve keeping databases of logs and records at a central location, which include information such as the location and type/function of the particular item, the services or customers connected by the plant, and so on. This information is usually initially generated by network planners in the form of plans or estimates, and engineers subsequently provide updates when they carry out work on and using the item, where such work includes installation, or subsequent maintenance or repair. Deviations from planned work is reported e.g. by telephone, or via an online report, to request a correction to be made to the plan or estimate. This may be implemented manually, and where no version control is exercised, engineer updates may get out of synchronization with the central record, especially on repeat visits, which are not recorded or processed in chronological order.

Generally, the engineer creates a record to update the information on record after completing a job (either on paper, or by making an electronic note on e.g. a laptop), including the work done, the target time/cost associated, the identity and location and network context (e.g. the cable routing scheme reference number) of the particular piece of equipment or plant. The item identity and/or location is indicated by e.g. marker-pen, plastic tags and stickers (sometimes with barcodes), serial numbers and the like on the item itself. Any information and records updates or corrections generated by the engineer are then (if not already communicated earlier by e.g. telephone or via the Internet) brought back to the office or other central location, transcribed, and stored in a database which may be paper or electronic.

As may be expected, the above process suffers from a number of problems, in the number of potential failure points for recording of wrong, inaccurate, or even no information. Simple human error could result in forgetting to make a record, or transcribing wrong information, in the field or at the central location. The labels and other identity indicia on or at the item may be smudged or erased through time, through environmental factors such as wind, water, ice, or mice, as well as engineering activities such as scuffing from cable installation. Bad handwriting and fading ink may be an issue, and poor adhesion or other detachment likely over the several decades lifetime of the installed plant. Delays in synchronizing field and centralized information means that most information given to engineers undertaking these tasks must be treated with suspicion, until confirmed correct, through observation and checks, on-site, or risk service affecting errors from mis-information. It may be that the recording process is simply be not carried out at all. Records may also be mislaid or lost, especially if they are kept at different locations It is self-evidently desirable to obtain and keep good records of information about physical plant for a number of reasons, e.g. for purposes of physical asset management, accounting and auditing. An enterprise should have general and detailed knowledge of what it owns, to track their location, quantity, condition, maintenance and depreciation status.

Fault location is a known problem in any large, complicated system or network. Time, effort and other resources are wasted in locating a particular piece of equipment in the field, if records are incomplete, inaccurate or completely missing. Given the geographical extent of the network, an engineer may be forced to embark on trial-and-error in trying to find the correct item to fix. Delay in rectifying the problem adversely affects customer relations, and depresses quality of service standards, which may result in failure to meet contractual performance targets and standards. Guesswork on the engineer's part in the field runs the further risk of causing accidental damage while inspecting a piece of equipment before it is realised that that is not the faulty item he is looking for, imposing a risk of service affecting intervention faults. Unnecessary and potentially-risky activity in climbing up poles in windy conditions, and climbing down into footway boxes full of rainwater is undertaken to find equipment which is actually located elsewhere. Time and mileage is wastefully expended on needlessly driving around.

Poor plant records hamper not only the activities of the field force, but the whole of the operations and management of the network, in particular, the its effective utilisation, repair and planning aspects. Engineers, planners and other operational staff are an increasingly expensive and valuable resource which should be used efficiently. Accurate, complete and up-to-date knowledge of the location and other details of plant and equipment will go a long way to achieving efficient operation and savings in time, money and manpower resource.

US 2004/0156601 describes a cable which has a helically-slotted core, formed in a production process in which an RFID tag is glued in place in a designated slot before a sheath is extruded over it. This method does not work on surfaces without slots, and so is limited in its application. In particular, it cannot be used with "Action" cable which the applicants use for the installation of blown optical cables, as will be described further below.

WO 2007/114446 describes an RFID reader which is placed in the cylindrical body of a holder, which can accommodate a tagged syringe. The reader is however limited to use in the specific application, and would not be suitable for use in a system or network comprising many tagged items, some of which need to be located in the first place, and its records component subsequently located and read.

SUMMARY

The applicants have developed an end-to-end system for developing a record database which addresses the above problems. This approach can be applied to legacy networks to gather information about plant on which work is being done, although it is particularly useful in a new-build network which would allow for accurate information to be gathered right from the start. The system is based on an automated upload/capture of the equipment and plant actually installed into the network "as it is built". Worldwide interest and activity in building new Fiber to the Home (FTTH) network infrastructure and new-generation networks present an opportunity to adopt an improved method of generating network plant data records and databases. The data captured can potentially not only provide information about specific items, but also their inter-relationship or context within an interconnection or association within a data-set In one embodiment, there is provided a method of forming a cable comprising an elongate core, comprising positioning a records component proximate to the elongate core, wrapping the elongate core in a flexible material before the step of covering the records component, and covering the records component with a cable covering which directly or indirectly urges the records component against the elongate core.

Embodiments provide a way to manufacture a cable which is pre-tagged. Upon installation (or other work done on the pre-tagged cable), its identity and other information can immediately be captured and recorded without need for separate labelling. This method provides that a records component (which in the description is primarily exemplified by RFID tags although other recording components such as bar code, color or pattern coding, can be used to equal effect) is provided either immediately, or almost immediately under the outermost cable covering. This covering could take the form of a label over the records component although more advantageously it is provided as a continuous sheath which covers the entire length of the cable to protect it against e.g. water, rodents and the like.

There are several possible locations for the records tag in the cable in embodiments. For example, the tag could be applied directly to the elongate core which comprises optical fiber transmission lines (fiber, copper or the like) or which in the present example comprises blown optical fiber tubes (described further below). If a flexible material such as water swellable tape is used in the cable, the records component may be incorporated into the tape, or else be applied to the tape after this has been wrapped around the core. The tags can therefore be applied before, after or during the wrapping of the elongate core with the flexible water swellable tape.

When the sheath cover is applied to cover the records component, the latter is pressed against the elongate core element, either directly, or indirectly in having a measure of buffering protection by being embedded within, or by lying between, layers of the water swellable tape. Thus the records component may be separated from the outermost covering layer by one or more intermediate layers, but the force which presses the tag in place and which prevents it from moving is supplied from the outermost sheathing cover, which traps the component against the surfaces (which could be the core, the tape, the sheath and so on) against which it rests.

In another embodiment, there is provided a cable obtained by the method.

In another embodiment, there is provided a system for of forming a cable comprising an elongate core, comprising driving means to drive the elongate core along a production line, the production line comprising extrusion means to extrude a cable covering material, and positioning means to position a records component proximate to the elongate core enabling the extrusion means to extrude the cable covering material over the records component so that upon cooling the cable covering material directly or indirectly urges the records component against the elongate core.

The production line allows for a cable to be assembled from sub-components which comprises a cable core e.g. a bundle of blown optical fiber tubes and a record component, wherein a cable covering is extruded over the assembly to keep the elements in place and to protect them from the elements.

In another embodiment, there is provided a cable comprising an elongate core, a cable covering, a flexible material disposed between the elongate core and the cable covering, and a records component covered by the cable covering which directly or indirectly urges the records component against the elongate core.

In another embodiment, there is provided a system comprising a cable, and a records components reader comprising a member having a concave surface, a transceiver disposed on the concave surface, for generating a reading field enabling an interrogation to be sent to a records component and a response to be received from the records component, and shielding means for confining the sending of the interrogation and the receipt of the response within the reading field.

A tagged cable is advantageously used in conjunction with a reader which is arranged to read a records component which is disposed on a curved surface. An embodiment of a reader generates a directed reading field which concentrates the reader antenna output onto the cable surface, allowing for improved signal coupling to enhance the chances of a successful reading session.

In another embodiment, there is provided a method for recording work done in a system comprising automatedly recording location and identity information associated with the records component of the cable on completion of work done using the records components reader.

In another embodiment, there is provided a method for locating the cable in a system comprising using Global Positioning System (GPS) information and the records components reader.

Use of the pre-tagged cable allows for records to be automatically generated, thus improving the chances of successfully locating the same item at some subsequent time.

BRIEF DESCRIPTION OF THE DRAWINGS

Embodiments will now be described, by way of example only, with reference to the following drawings in which.

DETAILED DESCRIPTION

Implementations of embodiments will be discussed herein in the context of a telecommunications network, although it would be appreciated by those having skill in the art that embodiments can be deployed in any type of network or system. Indeed, embodiments need not be implemented in the context of a network or system at all, as it can also be usefully deployed for a single item of equipment, plant or other physical item.

As noted above, the method involves the tagging or labelling of all equipment and plant in a manner which would allow for it to be subsequently accurately identified and to be geographically located. This could be carried out to provide to each item within the network with a unique identifier or reference; alternatively a generic/class tag for a class or type of product could be deployed. A record can be then generated for each item by the engineer working on the particular job using an electronic device which can obtain information from the tagged plant or a group of interconnected tagged plant items e.g. joint and its connected cables, which record can be then sent to a central records office or database.

There are a number of known plant-tagging possibilities which may be adopted. Color-coding, by applying the chosen color or colors (e.g. a multi-color pattern on a single item in the form of e.g. stripes, or the employment of a number of colored sub-elements such as 24 differently-colored element tubes deployed in one cable) to the article(s) itself, or by separately applying a colored sticker to the item, is known and already in use. The color- or pattern-coding can be checked against a reference which will provide further information about what the color or pattern signifies. Serial numbers, whether depicted in human-readable form, or in the form of barcodes or chemical sequence bar-codes may also be used. Certain types of radio-frequency identification (RFID) tags or transponders may allow for more information to be carried about the plant item, or a range of serial numbers large enough to allow unique non-repeating identities. Other techniques are possible; many of them involve retrofitting already-manufactured items, often in the field after deployment of said items (e.g. in legacy systems or networks, where the item is tagged, or where the tag is written to, only after installation).

Records components (such as labels, barcodes, RFID tags, colors, patterns, serial numbers or letters, and the like) hold or contain information about the item to which they are attached or are otherwise associated. The information could be as general or specific as is needed. At one extreme, each item in the network or other system may be associated with a records component which includes a unique identification number, allowing for very specific information to be looked up about the item in question, such as the item manufacturer, model, make, date of installation, when it was last worked on, what that work consisted of, etc. Advantageously, it is possible to generate a holistic picture of items within the network which are associated or related to each other, e.g. that a specific piece of equipment is part of the connection between Exchange A and Customer X. At the other extreme, a records component may carry much less specific information e.g. that the item is a particular type of cable having certain characteristics, wherein no separate reference or looking up is required.

Certain types of equipment and plant, however, are not so easily tagged. This may arise due to the fragility of the records component itself, the difficulty in reading the data contained therein, or physical interference or hazard from a projecting attachment. Data on many records components is readable only by machines, e.g. barcode scanners and RFID readers. Items or equipment which lack a suitably accessible surface may not be able to accommodate a barcode, or where not substantially flat, an RFID tag, or other plant attributes may hamper reliable interrogation of the tag.

As is well known, RFID tags comprises an antenna and an application-specific integrated circuit (ASIC) which is available in very small sizes. For example, a "TAG-IT" tag by TEXAS INSTRUMENTS INCORPORATED measures 0.3× 1.45×1.2 mm, and an example of an even thinner tag is the "I-CODE" tag by NXP SEMICONDUCTORS which measures 0.15×1.5×1.5 mm. As RFID tags can be read without line of sight, and because the ASIC is a relatively delicate item, the entire tag may be placed under an external skin or sheath. Care has to be taken in applying the tag as the ASIC is rigid and (especially for the very thin tags) susceptible to cracking or breakage under high levels of pressure, heat and bending. Its electrical connections with the antenna are also stressed in these circumstances.

RFID tags can be active, passive or hybrid types, primarily in dependence on whether they carry their own onboard power. Passive tags carry no power of their own, and to respond to a reader, they need to be powered up by the electrical current transmitted by the reader in the incoming electromagnetic wave or radio frequency (RF) signal. The response signals output by tags are typically very weak, divergent and prone to interference or distortion from local materials such as metals and liquids. In situations where a high numbers of tagged items located in very close proximity to the target tag, a nearby tag may respond instead, causing the reader to confuse it with the intended item. The problem is exacerbated when the item to be identified is cylindrical with a small diameter, such as cables, tubes, wires and the like, where nearby tagged items are very closely spaced, or in close contact, as is often the case in equipment racks, cabinets and the like. In some situations, there is so much equipment in a crowded space that it is not even possible to visually identify the particular item, much less to locate its tag for reading. In such cases, the records component has to be first "found", or located.

In applications such as the present, passive tags are used for their cheapness and small size (and unobtrusiveness). Tags have to be carefully positioned when applied to the article in question. The antenna and the ASIC of the RFID tag may be placed on a curved reading plane such as the surface of a cable or pipe, which presents a reduced effective read/write area to the scanner or reader, compared to a tag positioned on the flat surface which present a larger effect surface area.

In general, the efficacy of an RFID reading is dependent in the main on the following key variables:

The amount of "noise" generated during a reading, which saturates or interferes in the operating frequencies used for RFID such as that by devices and items surrounding and the target tagged article, which could include motors, street lamp circuits, electric fences, mobile telephones, lightning, or trains.

Sufficient launch power for the RF signal from the reader to reach the target tag.

Effective return power from the ASIC of the tag—this is particularly important for unpowered passive tags.

Sensitivity of both tag and reader's antennas & circuits to the RF beam, so a sufficient surface area across or orthogonal to RF beam is crucial for a successful reading.

The medium or materials between and around the RF tag/reader working space, as the dielectric properties of the chosen materials determine whether the RF signal is absorbed or reflected.

One approach to tagging cables and the like, is to attach a barcode or an RFID tag pre-mounted on a substantially flat surface (such as a flat plastic tab, or a sleeve), which is in turn attached to the cable or the like using cable ties, clips, and so on. This approach suffers from various problems, such as snagging, sliding movement along the cable if it is not sufficiently tightly fixed, its susceptibility to tampering, and so on. Another approach is to use labels carrying the RFID tag, known also as "inlay tags". These are often supplied on a self-adhesive or pressure-sensitive backing allowing for attachment onto the item to be tagged. Existing inlay tags have, however, proved to be fragile, and the adhesive unreliable in the harsh environments where such cables are deployed. These are, in any case, retrofit solutions for legacy network plant and equipment, and involves manual application of plant—an awkward and costly application process, with potential for human error in their use. This is so particularly where cable or tube population density is very high e.g. in a fibre distribution joint. Thus, it is also difficult to include a tag at intervals along the cable, where much of the surface area to be tagged is inaccessible.

It is therefore desirable to maintain records of cable and the like that will be newly deployed in the network, in a way which allows field engineers or other operatives to easily capture data for the automated generation of a detailed and accurate physical asset database, ideally in real-time. It should also be able to subsequently lead engineers directly back to these locations and plant at a detailed level, to perform repair or other re-visit tasks, with maximum efficiency. The solution should be cost-efficient to deploy without need for separate application, and without limitation to items having a specific type of surface, using durable and reliable tags which provide accurate information, and which are able to withstand the rigours of a potentially-hostile environment underground, overground or in the air, over the item's lifetime e.g. over a minimum of a 25-year period for telecommunications network line plant, or such other period desired, or required by service level agreements, warranties, or the like. The labeling of the ubiquitous cable, piping and the like, as well as the subsequent reading thereof, presents particular problems owing to their shape, location, close proximity of other plant items and the potential sources of interference existing in a telecommunications network.

Asset Record or Database Generation and Use

Figure 1:
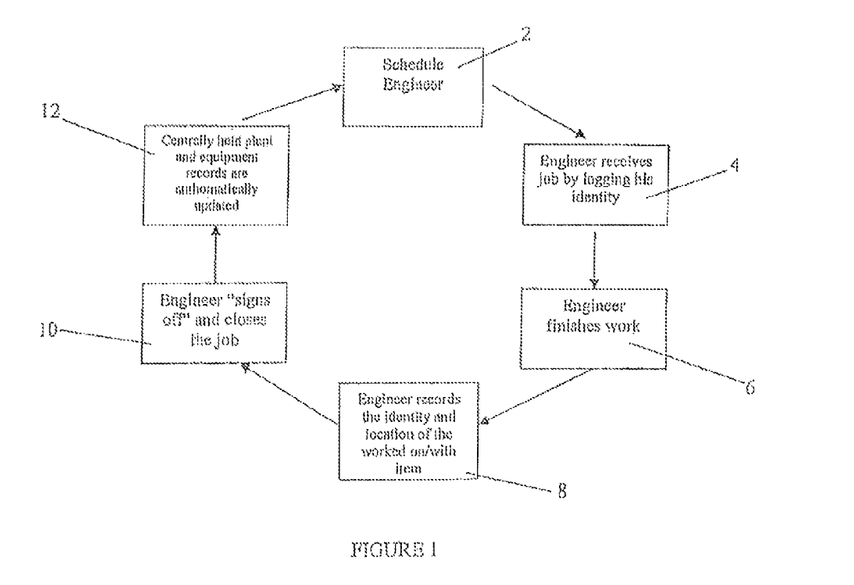
FIG. 1 depicts the flow of the record generation and management process.

The main process flows of the end-to-end system and method developed by the applicants for use in generating network plant records for physical asset management is set out in schematic form in FIG. 1. In the first step (2), an engineer is scheduled to work with a certain piece of plant or equipment, e.g. for a new installation, repair, a revisit or the like. A job is opened for the work, detailing the plant items to be supplied and its location. The engineer receives the job by logging his identity in the next step (4), which could be the simple manual entry of an identity reference number in an online system, by use of an identity RFID passcard, using a fingerprint reader, or the like. When the engineer finishes the work in the next step (6), he records at least the identity, and the location, of the item he worked on or with in step (8), wherein the record includes the time data of job completion. This is done in an embodiment with an electronic hand-held device, which is used to "read" the item either by scanning or otherwise reading the colour, barcode, RFID tag etc. located on or proximate to the item in question. By doing so, the engineer "signs off" and closes the job in the following step (10). Thus without making a record of the plant identity and location, the job cannot be closed. By signing off the job, the centrally-held plant and equipment records are automatically updated in step (12). This ensures that the database of plant information is refreshed with the most current details every time work is done on that item.

In the process, the identity (and other information e.g. manufacturer, type, description, and cable meter marker) pertaining to the plant or equipment is already contained in the records component (such as the color-code, serial number, barcode or RFID tag) attached to or associated with the item. This information, together with the item's geographic location (which can be described using positional coordinates, derived from GPS satellite positioning systems, or other such other methods) may be automatically captured and recorded upon close of the job at the site, using the electronic device carried by the engineer. In an embodiment, the engineer is prompted to provide all such information when attempting to sign off Without need for separate transcription or manual entry, there is considerably less risk of recording wrong or inconsistent information, e.g. by the engineer manually writing the information with a blunt pencil down on paper wearing thick protective gloves while standing knee-deep in muddy water in a footway box during a snowstorm.

An embodiment of the above process requires that all items of plant and equipment needing to be recorded and to be subsequently identified and located, already include the necessary records information or component pre-installed. Such pre-installed records components can be "read-only", to reduce the possibility of mistakes being made. However it is possible in some implementations to use writeable tags that would permit updating and the generation of fresh data in the field.

For this, the applicant proposes using RFID technology for "aggressive" environments (e.g. in joints and cable sheaths, which are often deployed in underground footway boxes, or up telephone poles), barcodes in "benign" applications (e.g. equipment racks and splice trays which are sited in a more protected place), color-coding (e.g. for tubes used for blown fiber located within distribution joints), and Global Positioning System (GPS) to locate major items of "street furniture" (e.g. footway boxes or buildings). The electronic device carried by the engineer to sign off jobs and/or to locate items, could comprise a single unit capable of reading one or more of RFID tags, barcode, color, and include a GPS functionality and wireless communications for data synchronization with the central database records; alternatively separate units for each of the functions may be used.

Figure 2:
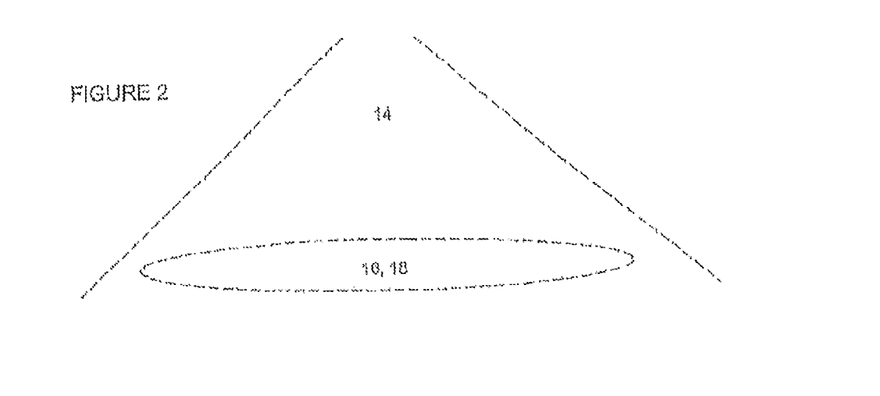
FIG. 2 is a schematic view of the method of locating network plant and equipment.

FIG. 2 depicts how a specific piece of plant or equipment may be located using the recording system. To start, the engineer uses satellite navigation or Global Positioning System (GPS) navigation data (14) to arrive within several meters of the item he is looking for. This GPS data can be included in the location information of the item obtained during step (8) of FIG. 8, e.g. by the hand-held device which could also be a GPS device. Alternatively, this data could be added before or after the scanning or reading of the records component on the plant. Thereafter, the engineer's hand-held electronic device can then be used to pin-point the exact item required for the job. The hand-held electronic device can comprise or include any capability needed to read the records component in question, e.g. it could be a barcode scanner (16) and/or a RFID reader (18), in addition to being a GPS device. Further specificity can be obtained by reference to a coloured or patterned sticker, or a serial number.

Figure 3:
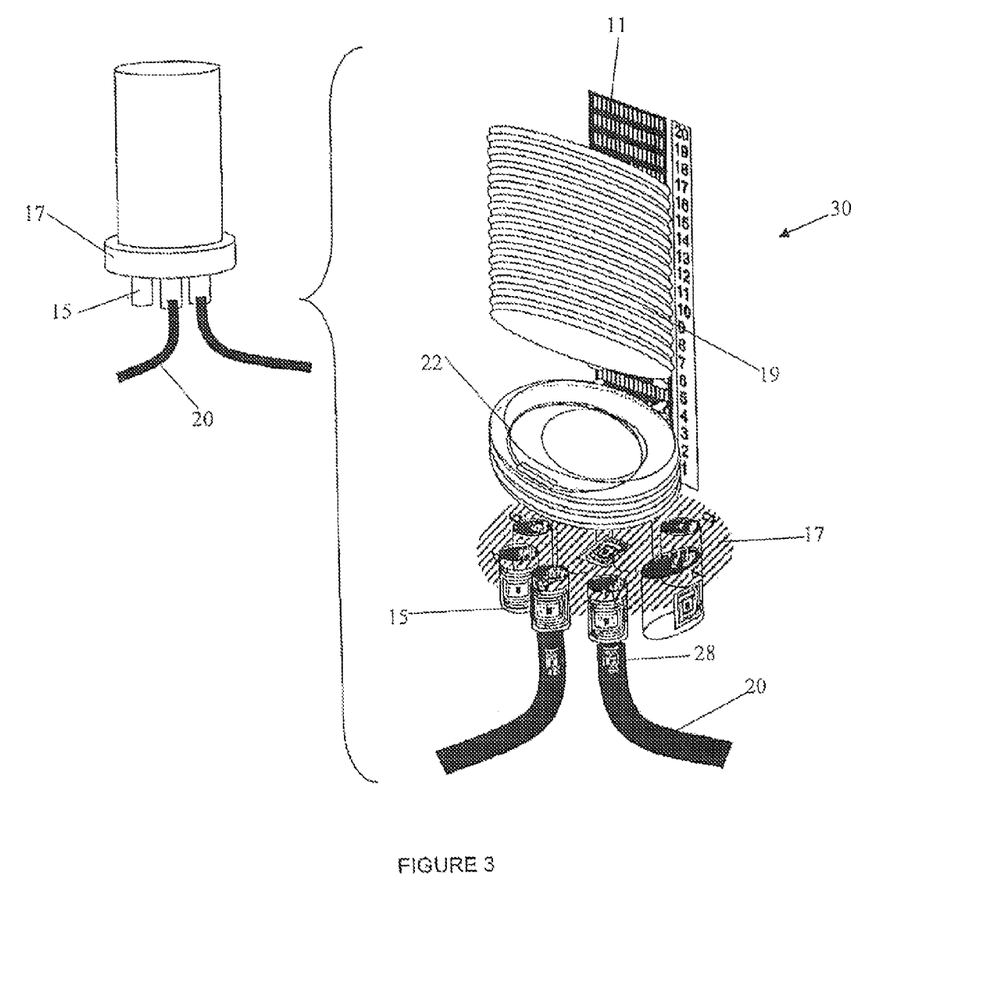
FIG. 3 illustrates the use of records components on equipment.

Referring to FIG. 3 as example: this depicts a distribution joint node (30) which is typically located in a footway box (not shown). The footway box is initially identified using satellite navigation. Once the engineer is within approximately three meters of the footway box, he will probably be able to see it. A number of cables (20) feed into the distribution node via cable ports (15) at its closure base (17). These cables are all RFID tagged (28), allowing for the engineer to confirm that this is the node he needs to work on, and to locate the correct cable. The splice trays (19) attached to the backplane of the node are bar-coded (11), allowing for identification of the desired tray. The blown fiber tube elements (22) and the fiber elements within the splice trays are color-coded, again for identification purposes.

The system and process thus builds data records almost by default, as a by-product of working on the network, by using easily-captured, consistent and reliable electronic data, and automatic procedures for job generation and sign off using again, employee identity information, a passcard, or the like. The data read on site can be stored locally e.g. on the engineer's laptop or PDA. In implementations, the read data can be sent to a central database for storage. It is possible also for the data to be coordinated or synchronized to that already on record, so that any inconsistencies may be picked up, and the engineer could be instructed e.g. to check again or to do further work while he is still at the site.

A lot of the risk for human error inherent in manual tasks is removed from the record-generation process. In addition to obtaining a superior overall view of the physical and other assets deployed in the field for planning and management purposes, considerable operational savings may be achieved as a result, as both plant and personnel can be then used more productively.

Additional benefits may be realized from offering the engineer access to relevant information concerned with his activity, such as current or updated installation instructions or safety bulletins specific to the plant or location. Advantageously, the system may also allow remote monitoring of the engineer's whereabouts to ensure his safety when working alone, to ensure readiness for tasking of next job, providing him with assistance, or the like. The system may also indicate progress of the job by reference to the time to completion.

The following describes particular implementations of records components, and methods and apparatus for reading records components, often in the context of RFID. The skilled person would appreciate however, that the invention is of more general scope and susceptible of being used in the context of a variety of records components with appropriate modification.

Records Components Tags

RFID tags in particular have been found to be ideal as records components for all manner of plant and equipment, from distribution joint nodes up telephone poles, and down footway boxes, to equipment racks located within telephone exchanges. RFID tags enjoy the advantage of not needing a line of sight for use, unlike barcodes or colour codes, so it may be covered by a protective layer. The skilled person would nonetheless be aware that it is possible to protect records components which do need a line of sight, under a transparent or sufficiently clear cover, although this may be affected by dirt or the like obscuring the information, or text written in a limited space or which is illegible.

As noted earlier, problems with the use of RFID tags have been experienced particularly in connection with items where the tags need to be applied on extremely curved surfaces such as spherical objects, or cylinder-shaped items such as tubes, tube connectors, pipes, various types of cables—copper, co-axial, optical fiber and the like, electrical wiring, as well as substantially spherical objects and so on. This is a problem made worse by there usually being a great many other plant and equipment items which also bear RFID tags and/or which include metals (twisted copper pairs, for example) and other materials which interfere with the RF link between a reader and a tag of the target item as described earlier.

Figure 4:
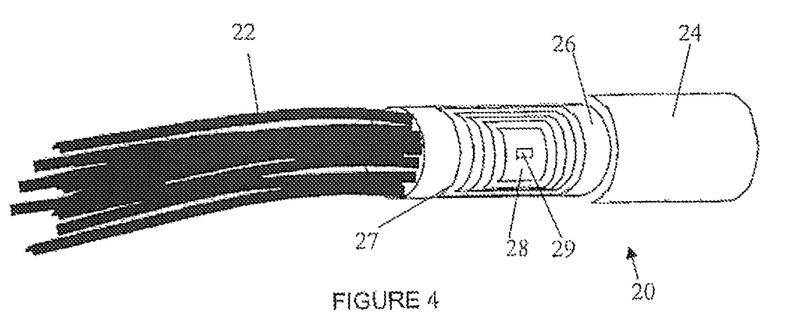
FIG. 4 is a side view of a first embodiment of cable.

FIG. 4 depicts a cable of the invention with the top layers partially stripped away to show the underlying layers. The cable (20) has a core comprising one or more optical fiber or tube elements (22). The embodiment of the cable which includes tube elements can be a conventional loose tube cable (e.g. in blown cable such as the Cable Optical Fibre (COF) 200 by BRITISH TELECOMMUNICATIONS PLC, or ACTION cable, discussed further below), or blown fiber tube bundle, wherein tubes are pre-laid along paths to destinations which anticipate the need for an optical fiber connection but for which there is no present need, as is more fully described in EP108590, which is hereby incorporated by reference in its entirety. The connection to the destination is thus future-proofed, while postponing the cost of installing fibre through the tubes. The cable typically includes an outer sheath (24) which is made of e.g. high-density polyethylene (HDPE), and which protects the core from the elements after it is laid.

Figure 6:
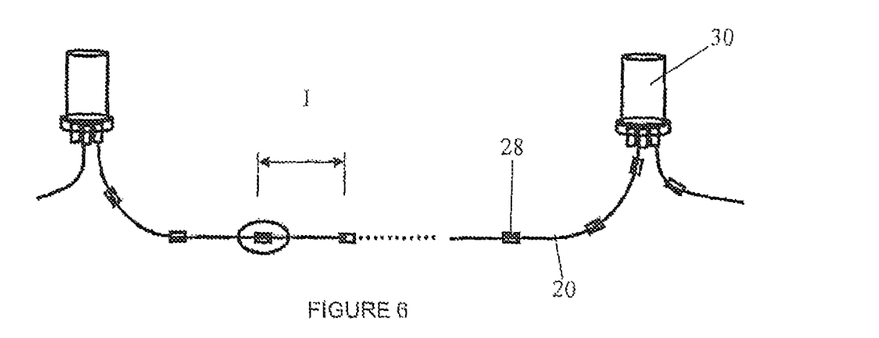
FIG. 6 depicts one deployment of exemplary cable.

Tags (28) may be incorporated within the fabric or construction of the chosen sub-element, e.g., at a single point along its length, at either or both of the cable's extreme ends, or at required intervals along its length. In some embodiments. RHD tags are included in the cable at intervals along the cable. For example, a tag every meter along could confirm to the engineer, who has access to the cable at different access points, that it is indeed the same cable. The tag could also provide information about distances between inspected portions of the cable, and so on. This is illustrated in Figure 6, where tags (28) are placed at fixed intervals I along the cable (20) between, e.g. distribution joints (30).

First Embodiment: Tagged Cable

The presence of moisture is particularly damaging to optical fiber, and so it is usual to include a flexible layer or material, film or tape (26 in FIG. 4) which typically comprises an absorbent polymer and polyester backing material between the core and outer sheath which absorbs any water which manages to penetrate the sheath layer. The flexible material swells when it absorbs water, with the effect that the longitudinal path along the remaining section of cable is blocked from further access by water. During manufacture of the cable, the water swellable tape is typically applied to surround the core by wrapping it so that the edges of the tape overlap in a direction parallel to the cable's longitudinal axis.

In embodiments, the cable further includes a flat inlay RFID transponder or tag (28), which comprises an antenna (27) and an ASIC or integrated chip (IC) (29). The tag is an integral part of the cable, and incorporated as part of the cable's design and construction. Because label-based tags are the most common form available and easily and cheaply available off the shelf, this tag format has been chosen for use in the formation of the tagged cable of the invention. Tags dimensioned for use on curved surfaces are known, such as the previously-mentioned "TAG-IT" tag. However, this product is not easily deployed on tightly-curved surfaces. By way of example, embodiments will be herein described with reference to one type of cable used by the applicants known as ACTION cable (manufactured by PRYSMIAN CABLES LTD) although it would be appreciated that embodiments may be applied to a variety of cable types, as well wires, pipes, conduits and the like, and more generally to any item with a curved surface. ACTION cable and cables with similar internal configurations used by the applicants range in size between 6 mm to 10 mm diameter in size. This is because, even though the antenna section of the tag is sufficiently thin and pliable to allow wrapping around the curve, the ASIC is relatively thick and inflexible, so that this part of the tag is prone to breakage under pressure or when traumatised, which could result if the ASIC is placed at an awkward angle on the cable surface. Careful placement of the ASIC, in particular, on the cable surface is required, to improve the chances of obtaining an attached tag which can be read over the in-life duration of the plant, e.g. 25 years as mentioned above.

The tag is shown in FIG. 4 as being located on outer surface of the flexible water swellable tape (26). In alternative embodiments, the tag could be placed under the water swellable tape (where the tag is attached to the core, or to the underside surface of the water swellable tape), or else be pre-embedded in the water swellable tape so that the tag is included in the cable when the tape is affixed to the cable. In one embodiment, the tag is located so that the vulnerable ASIC is positioned in the overlapping edges of the water swellable tape, i.e. so that part of the tag lies immediately below the sheath, and part it is not. This arrangement affords to the ASIC a measure of buffer protection against compressive pressure from the outer sheath extrusion process, as described further below. The skilled person would appreciate that other fabric or flexible material may be used instead of water swellable tape, as long as the material used affords to the ASIC in particular a measure of protection against the pressures experienced thereon during the extrusion process, and thereafter during every-day use especially when work is being done on the cable.

Figure 5:
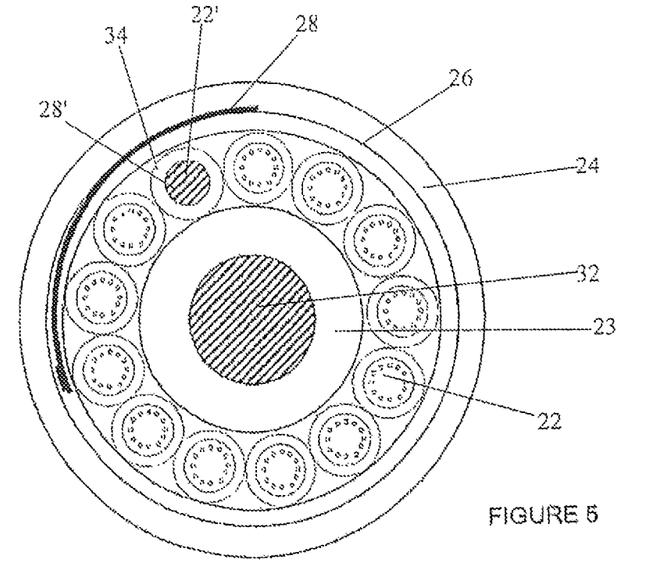
FIG. 5 is a cross-section view of a second embodiment of cable.

FIG. 5 shows more clearly how the tag (28) can be wholly or partially sandwiched by the overlapping sections or edges of the water swellable tape (26). The ASIC (29) is positioned so that it is protected by the flexible tape on its front and back. The ACTION cable shown in this FIG. 5 comprises 12 fiber element tubes (22) each of a diameter of 1.9 mm, which are pre-installed for later population by optical fiber units by the blown fiber method mentioned above, to provide the optical connection. In this figure, the tubes (22) are all shown to be populated with fiber units, save for an empty one (22'). The tubes are arranged around a strength member (23) which provides tensile strength and stiffness whilst the cable is being installed. The cable may include a copper toning wire (32), which serves to trace the cable's path underground by detection of an injected radio frequency tone or signal. The entire cable is protected by an outermost covering layer or sheath (24).

A method of manufacturing or assembling the above exemplary pre-tagged cables will now be described in connection with FIGS. 7A and 7B.

Generally, ACTION cable is manufactured or assembled in the following steps:

Primary coated fibers are pulled through an extruder to form the optical fiber tubular sub-elements (22).

Several of these tubular elements are drawn through a series of guides to eventually surround a strength member formed from glass reinforced plastic.

The tubes and strength member as assembled are then bound in a wrapping of e.g. yarn to keep the assembly together, forming the core within the cable.

Figure 7A:
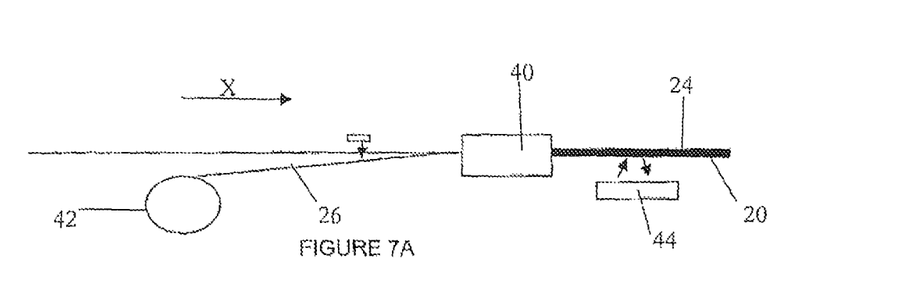
FIGS. 7A and 7B depict a process of manufacturing exemplary cable.

As shown in the production process in FIG. 7A, the core is transported along in the direction of the arrow "X", and then wrapped in a water swellable tape (26) drawn off in the same direction from a supply or a spool (42), so that the edges of the tape are wrapped around the core.

An outer sheath (24) is then moulded over the core wrapped in the water swellable tape (26) by extrusion, wherein the wrapped core passes through a die (a tapered annular injector) (40) to form the protective plastic skin. The sheath is applied under great pressure—200 to 300 bar—as the sheath plastic is in a partly-molten state at temperatures of about 200° C.

Figure 7B:
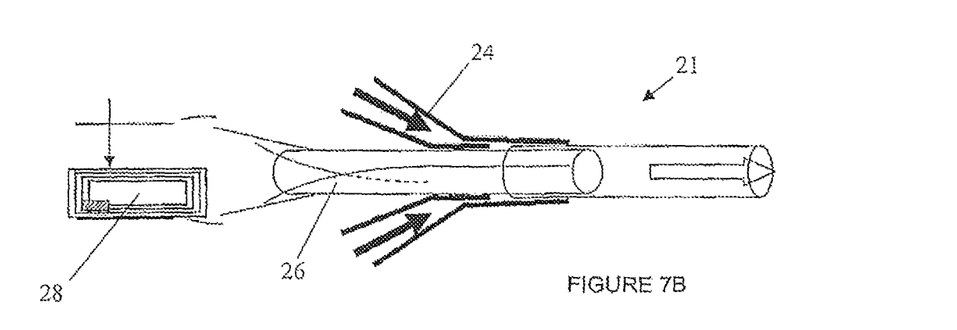

In embodiments where the tag is to be carried not in the cable core but under the cable sheath, the process includes two extra steps as shown in FIG. 7A:

the application of a tag (28) prior to the sheathing of the cable by the extruder (40), as shown in FIG. 7B where the tag (28) is applied onto the flat tape (26) before the tagged tape is wrapped around the assembled cable sub-elements (21); and the writing and reading of the tag by a scanner (44) after the sheath has been applied, as shown in FIG. 7A.

Given the fragility of the tag, particularly the ASIC, it is important to minimize the impact of the compressive pressure of sheath extrusion imposed whilst bearing on the curved surfaces of underlying element tubes. The tag could in one implementation have a sticky back so that a conventional pressure-sensitive or self-adhesive "sticker label" applicator could perform the task of peeling the sticker off its backing paper, and affix the tag for the short duration before that section of cable is sheathed by the extruder. It is possible for the water swellable or other tape used, to act as the adhesive using a hot-melt or setting process. It may not be necessary to separately provide the heat for this purpose given the temperatures involved in the sheath extrusion step. Yet another possibility is to "print" the RFID tags directly onto the surface of the tagged item by "ink-jetting" carbon ink onto the substrate.

As the tag is eventually kept in position by the sheath (or by water swellable or such other tape or material), it is possible to use methods wherein adhesive is not required for the short time and distance between the tag applicator and the sheath extruder or water swellable tape. Thus the tag affixing step could be as permanent or as temporary as may be required (depending e.g. on the conditions of manufacture, the distance to the extruder, etc.). For example it is possible to use air jets, or mechanical "fingers", so that a tag is held for only as long as it necessary in position on or relative to the item surface, just in time for the tag to be entrained into the water swellable tape or other flexible material as the core is dragged along the production line. In implementations where tape is not used, or where the tag is applied on top of the wrapped tape, the tag can be similarly temporarily held in place in the immediate vicinity of the extruder, so that the tag is almost immediately captured or slipped under the layer of sheath material, to press or squeeze the tag into its place within the cable.

As noted above, the RFID tag may be applied onto the water swellable tape, or directly on the tube-strength member core, i.e. under the water swellable tape layer. The tag applicator may be located at points along the production line either before or after the water swellable tape is wrapped around the core. In FIG. 7A, the tag is shown to be applied at a point along the assembly line to position it on the overlapping edges of the tape (26), as described earlier. This is depicted in more detail in FIG. 7B. The antenna portion of the tag should be positioned to ensure that it does not overlap itself, and that there is a sufficient effective surface area when it is wrapped around the cable.

The tape or other flexible material affords a measure of protection to the ASIC in particular, against the trauma that the tag might suffer with the high pressure and temperatures experienced during, and after, the extrusion of the sheath over the core. This is achieved by the relative "give" or the yielding properties of the flexible material, which absorbs some of the impact suffered by the tag during the sheathing step, when the pressure exerted by the extruder forces the tag ASIC so hard against a possibly uneven core of element tubes that breakage results. For this reason, although protection on either side is useful, the tag is most preferably positioned so that the ASIC is sandwiched and "floats" between the overlapping edges of the water swellable tape, or in any event between two layers of material so that it can be protected from direct contact with both the sheath and the core. Further features which ameliorate the pressure on the ASIC can be employed, e.g. pressure-equalizing apertures through the tag membrane, especially in close proximity to the ASIC.

In another embodiment, the tags may have been pre-embedded, e.g. at pre-determined intervals along its length, in the water swellable tape. In such a case, no separate tag application is necessary, although this would involve the cost and commitment in the making of a specialised product. The skilled person would also appreciate that some other flexible material or layer which may be used between the sheath and the cable core which could serve some other purpose, or else be dedicated to carrying or the tags, may be used in addition to, or in place of, the water swellable tape, for applications where the pipe, cable or other item does not require water resistance or prevention under its external sheath or coating. For example, a flexible expanding heat reactive material may be advantageously employed, which would encourage the semi-molten sheath material to spread more evenly and thus reduce irregularities after it hardens.

Shielding the tag against the sheath has the added advantage of preventing the semi-molten sheath material from attaining too tight a grip after the sheath covering cools and sets; an ASIC which projects too deeply into the sheathing material may create a rupture in the sheath cover affecting its protective and water-resistant qualities. Problems during the sheath extrusion process may also cause other problems affecting the integrity of the cable, e.g. the creation of voids under the sheath which impair performance.

Another technique for the inclusion of tags within the cable would include positioning the tags between two sheath layers, using a double extrusion method, where the second layer is applied separately downstream of the first extrusion. This provides for the tag a support surface which is firmer and smoother than the assembly of tubular elements forming the core. In such a case the tag applicator can be located between the two extrusion processes. Yet another way to incorporate tags into the cable is to use tags sitting on a substrate of a material capable of melting into the material of sheath (e.g. HDPE) to minimise any interference with the integrity of the sheath when fully formed.

In the embodiment of the cable wherein the tags are placed in a spare tubular element (34) or in the strength member (23) (described below), the cylindrical tags can be included into the tube or the strength member as part of the extrusion phase.

After the tags have been applied to the cable and covered by the sheath, the tagged sections of cable are then conveyed along the line to an RFID read/write unit (44) which writes data to the tags, and which also checks for their correct responses. Sections of cable with tags which fail to respond correctly due to tags being poorly positioned, broken, faulty, etc., can be identified and isolated.

It can be seen that the production process for manufacturing of a conventional ACTION cable needs relatively little modification. The production or assembly line for other cables, pipes or the like which include an external skin, cover or sheath by extrusion could similarly be adapted for the insertion of RFID tags in a similar way. The core can comprise one or more tubular members or elements as in the case of Action cables, or of optical fibres and fibre units. The core need not be populated at all; the invention may be used on a hollow tube or pipe comprising at least two layers the outer one of which is extruded onto the inner layer during production after the RFID tags have been applied.

Second Embodiment: Tagged Cable Sub-elements

As an alternative to positioning the RFID tag (28) substantially under the cable sheath so that it is proximate to, or within, any flexible water swellable tape, FIG. 5 shows an implementation of the invention wherein the tag (28') is positioned in a spare tubular sub-element (34).

As with the implementation where tags are inserted under the external skin of the cable, tags in this embodiment may also be incorporated at point(s) along the cable length, or at regular intervals along its length. In such cases, the tags can be pre-incorporated into the sub-elements as required, so that when the sub-elements are assembled into their places the cable, no separate tagging activity is required.

An example of a suitable cylindrical tag for use in this implementation is the "NONATEC" transponder LUTRONIC INTERNATIONAL), which is about 1 mm diameter and about 6 mm in length. The sub-element used in this implementation of the invention can be a spare fiber tube could be one which is not going to be used in any event, or else could be an additional, e.g. 13th tube, exclusively used or reserved for the RFID tag. Alternatively, the tag may be placed within the central strength member (23) of the cable, which typically comprises a matrix of unidirectional glass fiber reinforcing bonded in a synthetic resin. Any of the sub-elements within the core may be used for this purpose. The applicants have found that even with the presence of e.g. the copper toning wire (32), a tag implemented within the core could still be read without substantial disruption, due to the typically modest amounts of metal involved.

Where there is a significant amount of metal in the core however, they could be shield using foil wrappers and the like, to reduce their interference in a reading.

The sub-element upon or in which the tag is attached or included is not restricted to the form of an elongate member which co-extends with the transmission lines, optical fiber tubes, bore or the like between the extreme ends of the cable. As such, it is possible in one embodiment for the sub-element to simply comprise a cylinder which holds the tag, which is slotted into place within the other sub-elements (transmission line, etc.) within the cable core. In a simpler implementation, the tag could be fixed in position within the core without need for a carrier sub-element.

There are however advantages to using a tagged sub-element which is substantially elongate and which substantially co-extends with the other elements within the core. In particular, this simplifies the method of assembling the cable elements, as described further below.

The tagged sub-elements (spare tubes, central strength member(s), etc.) are initially formed before the cable elements are assembled, by using an extrusion process similar to that used to manufacture the cable outer sheath, i.e. by using pressurized extrusion through a die. Cylindrical miniature tags can inserted through the center of the die during the sub-element extrusion process to be entrained into the sub-element as it emerges as a continuous cylindrical member. The method of forming the tagged sub-elements can be made to be part of the process of manufacturing the cable, i.e. as a separate process performed upstream of the production line, so that the tagged sub-element product is then subsequently assembled with the other cable elements and eventually sheathed as described above. Alternatively, the tagged sub-element(s) may be manufactured as a completely distinct process (i.e. on a separate production line) to create a supply of tagged, specialized product which may be supplied to a producer of ACTION cable or the like, for incorporation or assembly thereinto.

Using sub-elements which are substantially continuous, elongate members (which serve as carriers for the records components) which substantially co-extend with the other cable elements simplifies the assembly process. Sub-elements which all take an elongate form require fewer processes to assemble: in this case, no separate step is required to insert or to drop discrete tags or other record components into the right place at the right time during a particularly complicated stage in the assembly process when a number of elements are to be bound together, or to be covered by the sheath material, etc.

Using the ACTION cable production processes as an example, the step of extruding sub-elements (tubes, strength members, or the like) can be relatively simply modified to include one or more cylindrical tags.

The skilled person would appreciate that it is possible also to use tags have other form factors e.g. an inlay tag such as the "TAG-IT" tag discussed above in this implementation as well. In such a case, the tags can be attached to the external surface of the sub-element. The above description of implementing cylindrical-form tags is applicable to the deployment of inlay tags, as the context permits. In particular, it is possible to apply the tags to the sub-elements in a way similar to the tagging of the cable itself (described below), either separately, or as an upstream step of the cable assembly process.

The above examples have been described using passive tags. The skilled person would appreciate that although active tags and semi-active or semi-passive tags are more costly and bulkier, there may be applications for which a higher performance tag may be desirable or necessary, e.g. for reading over greater distances. The latter tags having advantage of increased battery life through lying dormant until "woken up" by a reader addressing its passive functionality. The inventive concept described herein is as applicable to the deployment of active or other RFID tags.

It is possible also to use the method to form a cable which includes other records indicia, such as color-coding, barcodes and the like, with appropriate modifications to other cable components. For example, use of a clear sheath could allow for colors to be visible, or else for bar coding or other visual information to be seen or to be read, either by sight or by a suitable reader or scanner.

Records Component Readers

Where a reader or scanner is necessary to obtain the information from the records component (e.g. RFID tags, barcodes, as opposed to e.g. color coding), particular issues are raised concerning the reading process owing to the context of their use in the field.

In operation, a reading session starts with an interrogation where the reader generates an output in the direction of the records component. In the case of an RFID tag, this output takes the form short-range radio frequency signals via its antenna within a reading field. By doing so, it communicates with the tags, and also (in the case of passive tags) powers the tags so that they are able to communicate with the reader. For other types of records components such as barcodes, colors or patterns, this output would comprise light of some kind e.g. a focussed red laser in the case of barcode tags. Other output types are be possible, depending on the records component to be read (e.g. depending on the records component's chemical composition in chemical barcodes, its texture, shape, size, etc.).

As already discussed above, a curved surface presents some difficulty for the application or affixing of especially an RFID tag in the first place. The curvature also reduces the effective area of the electromagnetic wave (e.g. RF, or light) field launched from the scanner that can couple with the tag. The scanner's RF radiation is typically focused along one axis, and so only addresses only the part of the curved tag surface nearest to it. Analogous problems may be experienced in the reading of records component comprising a pattern, as the detection of different parts of the pattern on the curved label by the scanner could yield different results.

In the case of RFID, tags typically return relatively weak RF power levels to the scanner; passive tags in particular, rely on the scanner's transmitted power for their activation, and response. In the above implementations using inlay tags positioned under the cable sheath or otherwise within the cable, the reading is hampered by the positioning of tags which, like those described above, are not disposed on the surface of the scanned item, but under the sheath or within the cable, thus adding extra material thickness through which to read.

In the embodiment which uses cylindrical RFID tags in a cable sub-element, the problem of reduced electro-magnetic field may be even more of an issue (as compared to a planar inlay type tag) since the cylindrical tag's RF field is strongest at its end faces along the cable axis, with weaker radial fields. Even a tag which is disposed immediately under the cable sheath will be harder to successfully read, compared to one which is applied to the cable surface. In such cases, tag-reader engagement may require that they touch, or nearly touch.

In any event, all RFID tags, regardless of their form factor, may be deployed in an environment including many sources of interference or mis-reads in a reading session. In the example of a telecommunications footway box in FIG. 3, which is typically very congested with much equipment and limited visibility and hand access, there can be expected to be a number of similar tags (28) applied on, in and around the distribution joint (30). Each tag includes its own antenna which as a transducer is capable of picking up the RF signal from a reader if they are in sufficient proximity with the reader. It is important to provide to the engineer some confidence that the correct, targeted item is addressed, and that the response to the interrogation signal is not from another tag.

There is very likely to be metallic elements near to the targeted tagged item (radio waves are reflected off metal surfaces), and the footway box (being located underground) is often wet, possibly partly flooded (water typically absorb RF waves). Depending on the RFID frequency used, the interference from the metals, liquids and so on, may interfere with the ability of the engineer to obtain the identification information he seeks from a particular piece of equipment.

Figure 8A:
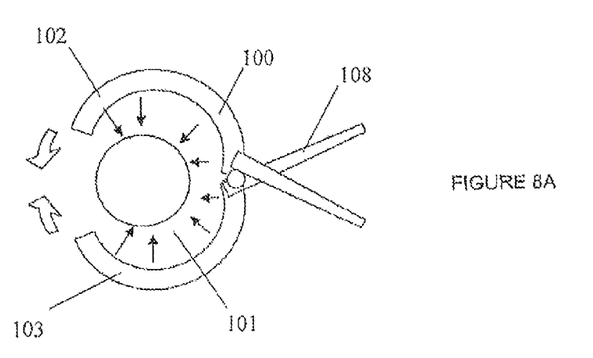
FIGS. 8A and 8B depict a first embodiment of an RFID reader.
Figure 8B:
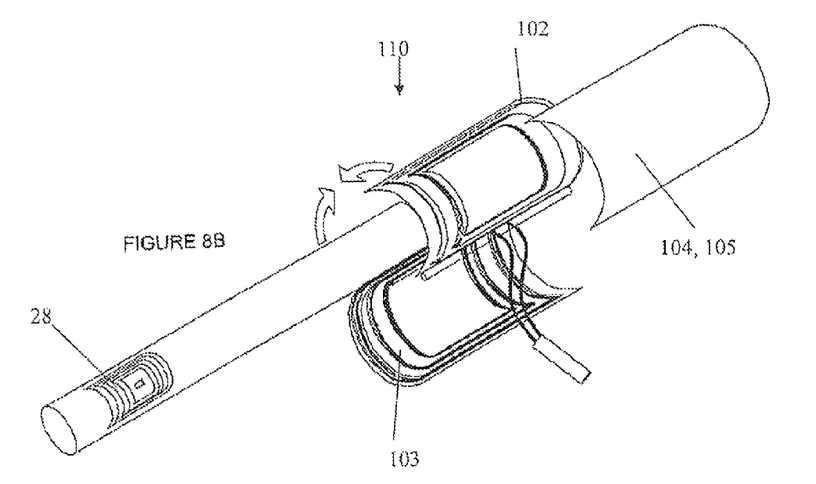

FIGS. 8A and 8B depict a reader which addresses the problem of poor RF coupling that arises from the tag antenna's placement and from its environment. A portable scanning device (100) which in this embodiment takes the form of "tongs", allows for record components to be "found" on the items they are attached to or are otherwise associated. Two curved members (102, 103) which are hinged to each other, can be opened and closed as shown by the arrows, operable by a pair of handles (108). The reader logic and circuitry (not shown) to operatively connect to a reader antenna (110) is powered to generate the RF field (101) transmitted to the antenna of a tag, is positioned on the inwardly-facing, or concave surfaces of the members. This has the effect of directing or focussing the RF signal substantially towards the centre of the generally circular space defined by the curved arms. This shaped electro-magnetic RF field may thus enable a superior RF link with a tag antenna which is disposed on a curved surface. Such a reader antenna could take the form of a cylindrical collar, or split-cylinder antenna, or it could comprises a flexible membrane capable of curving or curling. The device is powered by either an on-board battery or else is connected to a power source.

The curved members extend sufficiently from the handles, so that the whole or a large part of a circular space (or generally circular space) is described in cross section between or within them. In other words, the curved members can take, substantially, the shape of all or part of a circle in cross section. In use, the curved members are hinged opened and then closed again to fit around the cable, pipe, wire or the like which is being scanned. In an embodiment, the circular space between the curved members is sufficient to accommodate the cable etc. so that the scanning device can be easily slid along the length of the cable as shown by arrow "Y", yet enabling close proximity between reader and any tag, e.g. touching, or between 3 to 10 mm of each other.

In the present embodiment of the scanning device (100), the effect of the directed or focussed transmission of the RF signal by the reader antenna is helped by the shape of the curved members, as they provide some shielding against signal "leakage" from the antennae of the reader and/or the tag during a reading session, and also discourages any external interference from affecting the RF coupling between reader and tag. The shielding effect provided by the antenna substrate (102, 103) can be augmented by the inclusion of shielding layers (104, 105) specifically deployed for that purpose, in the form of e.g. reflective material such as aluminium on the outside, convex surfaces of the curved members, as shown in the partially exploded view of FIG. 8B. The shielding layer is shown in the figure to be substantially disposed along the convex plane substantially parallel to the antenna, although the skilled person would appreciate that the shielding layer need not be arranged parallel to the antenna, as long as it is disposed on the "back" of the antenna, i.e. away from the surface from and to which signals are sent and received by the antenna. Where necessary or desirable, the shielding layer could extend orthogonally to the curved plane, to define a communications field or zone within which the RF signals are confined during scanning. Alternatively, the shielding need not be provided as a full layer along the "back" of the antenna substrate, but only along the edge of the curved members to ensure that that the signals exchanged during the reading session is confined within the curved members.

In use, an engineer opens the hinged curved members using the handles, and fits the scanning device over the circumference of the cable, tube or the like. The scanning device is then powered up to transmit an interrogation RF signal via the reader antenna. Because of the position and orientation of the antenna, the signal is directed specifically towards any tags on, or in, the cable. The field of the signal is thus constrained, and further isolated by the shields employed on the back of, and/or on the sides of, the curved members. If necessary or desirable, the engineer can slide or swipe the device in its closed position along the cable, in a way in which consistent level of proximity is maintained between the reader and the surface of the scanned item. One or more tags (e.g. where the cable is tagged at intervals along its length) can be located in this way when the tag responds to the interrogation signal from the reader, which may be signalled e.g. by a light or an audible tone. This is particularly useful where tags are out of sight, e.g. being stuck on the back surface of the cable, under the cable sheath, within the cable, or where the cable is hidden behind other plant, is located underwater, etc. In the case of barcodes, there is the problem of accurately aligning the line-of-sight between the barcode and the reading portion of the scanner, where the barcode label could have been applied to relatively inaccessible sections of the cable.

In the RFID context, use of a conventional reader could result in a number of false readings from surrounding tags and interference, the configuration of the scanner allows for the reader to be accurately placed in close proximity with a tag of the particular target item, and to maintain that proximity in a congested and unpleasant environment.

The skilled person would appreciate that a number of variations in the construction of the scanning device are possible. As noted above, it is not necessary for the curved members to form an enclosed circular band or a hoop, as long as the RF output of the scanning component is sufficiently directed to or focussed on any tags on the scanned item within the open arc formed by the curved members. Thus, a single curved arm where the reader antenna is disposed on the inwardly-facing surface, might suffice. A hinge-less version of the scanning device is possible, where the device either comprises a closed loop in which the reader or scanner antenna is placed on the inner surface. Alternatively, the antenna may be carried on the inner surface arc, i.e. an incomplete circle, where the curved members can be of "solid" construction and immovable, or in an embodiment where one or both members are capable of being bent to obtain optimal proximity between the antenna and the tagged item. The solid version of the scanning device has the advantage that the configuration or angle of the antennae carried thereon does not change through bending in use.

Furthermore, it would be appreciated that the scanning device may be used for any tagged item (or part thereof which holds the tag) which can be accommodated within the space described by the curved members; so that its use is not limited to items with a cylindrical, elongate form. For example, a tagged spherical object could be identified by passing it through the looped or arc'd scanning device.

Figure 9:
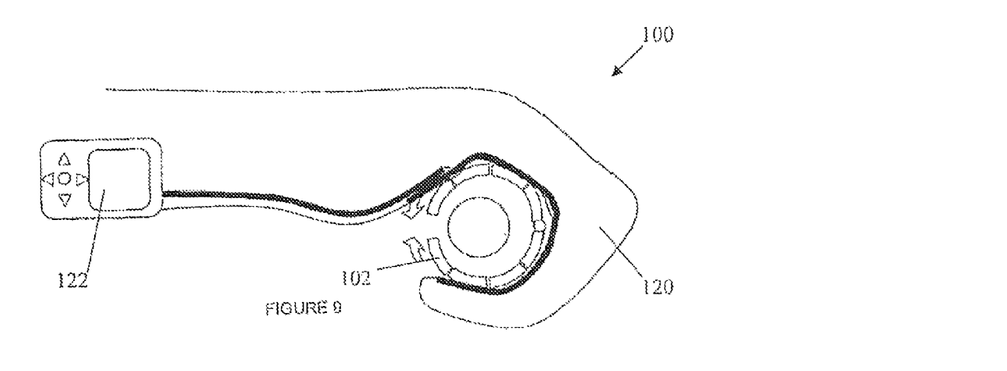
FIG. 9 depicts a second embodiment of an RFID reader.

Further embodiments of the reader according to the invention will now be described in FIGS. 9 and 10.

The scanning device (100) is advantageously deployed in a wearable form, such a glove or mitten (120), which allows the engineer to establish firm contact with the scanned object. Its use is of particular advantage in an environment with very limited hand-accessible space (e.g. between cables in a densely-populated node), where there may be no room for holding a separate scanner and pointing it. The reader antenna (102) is deployed on the palm-side, over the palm and/or the finger portions, which can be made as long as is required depending on the size of the item being scanned. In the embodiment shown in FIG. 9, the antenna membrane comprises several rigid sections which are linked or hinged to each other along the direction from e.g. wrist to fingertip.

The antenna may, depending on the size of the item being scanned, extend over the fingers of the glove or beyond, or include an exaggeratedly long finger section. The antenna can be attached to, or be an integral part of, the glove, which can be flexible, rigid or capable of limited flexing. This of course dictates the amount of possible movement—a rigid glove can be pre-curved and configured to allow a hand to be slipped into position. The curvature of the antenna on a semi-rigid glove can be made to adapt to different applications, and further to increase the proximity between reader and tag, while a fully flexible glove can be used for a wider range of purposes.

The natural movement of gripping movement of the engineer's fingers and thumb against the palm provides the force for wrapping or surrounding the antenna around the cable. A cylindrical or split cylinder antenna can be used. If some flexibility is required, the bend should be controlled to prevent the antenna from being curled beyond a specified minimum diameter as excessive bend angle between the antenna segments (102) would adversely affect its transceiving capability.

As is usual, the scanning device or glove is powered by e.g. a battery or is connected to a separate power source. When a tag is detected by its response to the interrogation signal, this fact could be signalled to the engineer with an audible beep, or in this context, by a haptic signal such as a vibrating sensation within the glove. The signals sent and received by the reader antenna are communicated to a processor, database or the like (122) which could be a "wearable" device such as a PDA on the engineer's person, or else could be transmitted wirelessly (e.g. Bluetooth) or otherwise, to a remote device. The data sent by the reader in the response signal can be then recorded, checked or used to perform a further look up in e.g. a remote data store.

The glove itself provides shielding to help direct the transmitted signals and to restrict the reading field to the targeted tagged item, and the engineer's hand within the glove provides even more shielding in use. In embodiments, this effect is reinforced by providing that part (e.g. the palm section, or section covering the back of the hand) or the entire glove is made of a shielding material e.g. a metallised foil, coating or textile.

Figure 10:
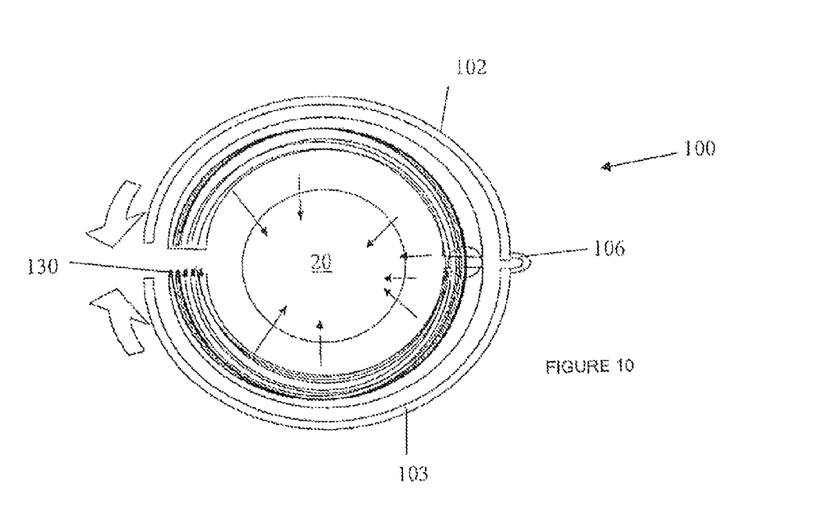
FIG. 10 depicts a third embodiment of an RFID reader.

In FIG. 10, an alternative implementation of the scanner (100) is a split collar comprising two curved members (102, 103) and a hinge (106) which may be clamped around the cable (20) or other item and secured by the nubs (130) which frictionally engage with corresponding slot on the end of the opposite arm.

A toroidal coil antenna typically comprises a ring shaped core or armature, and is made from ferrite, iron powder or amorphous iron material, supporting a copper wire winding. In the embodiment shown in FIG. 10, the two ends of the copper winding form the antenna circuit connection, which can be attached to the reader's transceiver in a part-torus, "U" shape. The toroidal antenna can also take a "split" form, so that it can be placed around a continuous ring or member. In the embodiment shown in FIG. 10, the nubs (130) further include electrical contacts permitting the antenna conductors located at the end of the curved members to complete an electrical circuit to form a true toroidal ring antenna.

In an implementation using barcodes, colour-coding, patterns or the like, readers or scanners using a beam of light from a photosensor are used to read the record component tags. Such readers may be configured in a similar manner as described above for the RFID reader, with appropriate modifications. For example, a color scanner identifies colours with greater accuracy if ambient light (which influences color properties such as hue, tone, shade, and so on) is removed from the vicinity of the reading element so that the only illumination is from a provided, controlled source of light. The shielding aspect of a reader advantageously allows for this to be deployed.

The methods and configurations as described above and in the drawings are for ease of description only and not meant to restrict the apparatus or methods to a particular arrangement or process in use. It will be apparent to the skilled person that various sequences and permutations on the methods and apparatus described are possible within the scope of this invention as disclosed.

The methods and apparatus described herein may also be used in a variety of contexts and applications, i.e. not only or exclusively within or for inclusion or detection of RFID tags in cables, but also for other records components such as barcodes and the like on any item tagged with such indicia and components. The invention is also not confined to applications within a telecommunications network or system, but is applicable to any set up including physical assets (plant, equipment and the like) which need to be managed and traceable.

The invention claimed is:

1. A method of forming a cable comprising an elongate core, comprising:
   wrapping the elongate core in a flexible material;
   incorporating a records component between layers of the flexible material such that the records component is partially but not completely sandwiched by overlapping layers of the flexible material, the records component configured to hold information related to the cable and readable by an electronic device; and
   covering the records component, after the wrapping of the elongate cork, with a cable covering which directly or indirectly urges the records component against the elongate core.

2. A method according to claim 1 wherein the records component is pre-embedded in the flexible material used in the wrapping of the core.

3. A method according to claim 1 wherein incorporating the records component comprises attaching the records component using at least one of either adhesive, an air jet, or mechanical means.

4. A method according to claim 1 wherein incorporating the records component comprises temporarily or permanently attaching the records component onto the elongate core.

5. A method according to claim 1 wherein incorporating the records component comprises temporarily or permanently attaching the records component onto the flexible material wrapping the elongate core.

6. A method according to claim 1 wherein incorporating the records component comprises incorporating a plurality of rigid records components.

7. A method according to claim 1 wherein covering the records component comprises applying a continuous sheath along the elongate core.

8. A method according to claim 1 wherein covering the records component comprises applying a layer of a semi-molten plastic at high temperature and high pressure.

9. A method according to claim 1 further comprising reading and/or writing to the records component.

* * * * *